(12) United States Patent
She et al.

(10) Patent No.: US 11,698,551 B2
(45) Date of Patent: Jul. 11, 2023

(54) POLARIZER, AND TOUCH-SENSITIVE LIQUID CRYSTAL DISPLAY (LCD) PANEL AND MODULE

(71) Applicant: BEIJING ZENITHNANO TECHNOLOGY CO., LTD., Beijing (CN)

(72) Inventors: Youzhi She, Beijing (CN); Shudong Zhong, Beijing (CN)

(73) Assignee: BEIJING ZENITHNANO TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/716,788

(22) Filed: Apr. 8, 2022

(65) Prior Publication Data

US 2023/0004043 A1 Jan. 5, 2023

Related U.S. Application Data

(63) Continuation of application No. PCT/CN2021/124273, filed on Oct. 17, 2021.

(30) Foreign Application Priority Data

Jul. 4, 2021 (CN) .......................... 202110754050.9

(51) Int. Cl.
*G02F 1/1333* (2006.01)
*G02F 1/1335* (2006.01)
(Continued)

(52) U.S. Cl.
CPC .... *G02F 1/133528* (2013.01); *G02F 1/13338* (2013.01); *G06F 3/0412* (2013.01);
(Continued)

(58) Field of Classification Search
CPC ...................................................... G02F 1/1333
See application file for complete search history.

(56) References Cited

U.S. PATENT DOCUMENTS

2013/0313098 A1* 11/2013 Chang ................ H03K 17/9622
200/600
2019/0064412 A1 2/2019 Chen et al.

FOREIGN PATENT DOCUMENTS

CN 103440068 * 12/2013 ........... G02F 1/1333
CN 103440068 A 12/2013
(Continued)

OTHER PUBLICATIONS

PCT International Search Report, PCT Application No. PCT/CN2021/124273, filed Oct. 17, 2021.

*Primary Examiner* — Sang V Nguyen
(74) *Attorney, Agent, or Firm* — Quarles & Brady LLP (57) ABSTRACT

The present disclosure provides a polarizer. The polarizer includes: a substrate provided with a first surface and a second surface that are opposite to each other; and a first triacetyl cellulose (TAC) film, a polyvinyl acetate (PVA) film and a second TAC film that are provided on the first surface of the substrate, where at least one of the first surface and the second surface of the substrate is further provided with a transparent conductive layer, which forms a touch electrode. The present disclosure further provides a touch-sensitive liquid crystal display (LCD) panel and module using the polarizer. The polarizer provided by the present disclosure can reduce the thicknesses of the touch-sensitive LCD panel and module, and simplify their production processes.

9 Claims, 7 Drawing Sheets

(51) Int. Cl.
*G06F 3/044* (2006.01)
*G06F 3/041* (2006.01)

(52) U.S. Cl.
CPC .......... *G06F 3/0445* (2019.05); *G06F 3/0446* (2019.05); *G06F 2203/04111* (2013.01)

(56) References Cited

FOREIGN PATENT DOCUMENTS

| | | |
|---|---|---|
| CN | 205451012 U | 8/2016 |
| CN | 107367785 A | 11/2017 |
| CN | 108646334 A | 10/2018 |
| CN | 113376728 A | 9/2021 |
| WO | 2014065000 A1 | 5/2014 |
| WO | 2015149264 A1 | 10/2015 |
| WO | 2014065000 | 9/2016 |

\* cited by examiner

FIG. 7

POLARIZER, AND TOUCH-SENSITIVE LIQUID CRYSTAL DISPLAY (LCD) PANEL AND MODULE

CROSS-REFERENCE TO RELATED APPLICATIONS

This application is the continuation of International Application No. PCT/CN2021/124273, filed Oct. 17, 2021, which claims priority to Chinese Patent Application No. 202110754050.9, entitled "POLARIZER, AND TOUCH-SENSITIVE LIQUID CRYSTAL DISPLAY (LCD) PANEL AND MODULE" filed Jul. 4, 2021, the contents of both applications are expressly incorporated herein by reference in its entirety.

TECHNICAL FIELD

The present disclosure relates to the field of display, and in particular to a polarizer, and a touch-sensitive liquid crystal display (LCD) panel and module.

BACKGROUND

With the development of technology, touch-sensitive display devices are becoming increasingly popular. At present, capacitive touch screens are mainly available in the market. In the field of LCD, touch modules are generally fabricated in the forms of on-cell and in-cell, among which in-cell is dominant. A glass-film-film (GFF) structure is typically used in the touch module. The touch sensing function of the touch screen is realized by the overall bonding of two optically clear adhesives (OCAs) and two patterned conductive film materials, which results in an increase in the product thickness. In addition, the GFF structure is typically manufactured by another touch screen factory, which leads to an increase in product cost.

SUMMARY

The present disclosure provides a polarizer that can integrate a touch module so as to reduce an overall product thickness and simplify a production process.

The polarizer provided by the present disclosure includes: a substrate provided with a first surface and a second surface that are opposite to each other; and a first triacetyl cellulose (TAC) film, a polyvinyl acetate (PVA) film, and a second TAC film that are provided on the first surface of the substrate, where at least one of the first surface and the second surface of the substrate is further provided with a transparent conductive layer, which forms a touch electrode.

The first surface and the second surface of the substrate may be respectively provided with transparent conductive layers, which may form a first touch electrode and a second touch electrode, respectively.

In an aspect, one of the first surface and the second surface of the substrate may be sequentially provided with a first transparent conductive layer, an insulating layer, and a second transparent conductive layer; one of the first transparent conductive layer and the second transparent conductive layer may form a first touch electrode and a second touch electrode, and the other of the first transparent conductive layer and the second transparent conductive layer may form a bridge; and one of the first touch electrode and the second touch electrode may be connected by the bridge.

In another aspect, the transparent conductive layer may be an indium tin oxide (ITO) conductive layer, an indium zinc oxide (IZO) conductive layer, a nano-silver wire conductive layer, or a metal mesh conductive layer.

The present disclosure further provides a touch-sensitive LCD panel, including an array substrate, a liquid crystal layer, an electrode layer, a filter, and the aforementioned polarizer.

The present disclosure further provides a touch-sensitive LCD module, including a backlight module and the aforementioned touch-sensitive LCD panel.

The polarizer provided by the present disclosure can reduce the thicknesses of the touch-sensitive LCD panel and module, and simplify their production processes.

REFERENCE NUMERALS

10. PVA film; 20. TAC film; 30. pressure-sensitive adhesive; 40. release film; 50. substrate; 51/52. transparent conductive layer; 53. insulating layer; 60. protective layer; 100. touch module; TX1/TX2. first touch electrode; RX1/RX2. second touch electrode; and BR. bridge.

DETAILED DESCRIPTION OF THE EMBODIMENTS

The foregoing and other technical contents, features, and effects of the present disclosure will be clearly presented in the following detailed description of preferred embodiments in conjunction with the drawings. The directional terms mentioned in the following embodiments, such as top, bottom, left, right, front and rear, are only used to indicate the directions shown in the drawings. Therefore, the directional terms used herein are intended to illustrate rather than limit the present disclosure. The present disclosure will be further described in detail below with reference to the drawings.

Figure 1:
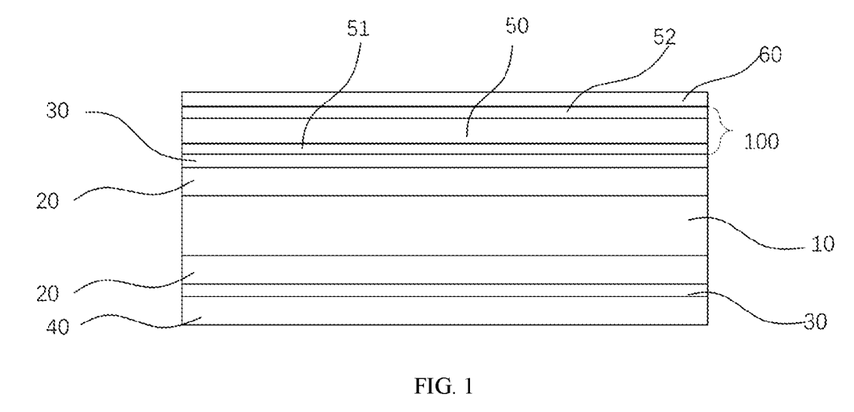
FIG. 1 is a structural diagram of a polarizer according to an embodiment of the present disclosure.

FIG. 1 is a structural diagram of a polarizer according to an embodiment of the present disclosure. As shown in FIG. 1, in this embodiment, the polarizer includes a substrate 50, a PVA film 10, and TAC films 20 provided on two sides of the PVA film 10. For convenience of description, the TAC film 20 close to the substrate 50 is denoted as a first TAC film, and the TAC film 20 away from the substrate 50 is denoted as a second TAC film. A pressure-sensitive adhesive 30 may further be provided between the substrate 50 and the first TAC film. A release film 40 is further provided on a side of the second TAC film away from the substrate 50. A pressure-sensitive adhesive 30 is provided between the release film 40 and the second TAC film. In the present disclosure, the polarizer integrates a touch module 100. A first transparent conductive layer 51 and a second transparent conductive layer of the touch module 100 are respectively provided on two opposite surfaces of the substrate 50. For convenience of description, the surface of the substrate 50 facing the TAC film 20 is denoted as a first surface, and the surface of the substrate 50 away from the TAC film 20 is denoted as a second surface. The first transparent conductive layer 51 is provided on the first surface, and the second transparent conductive layer 52 is provided on the second surface.

Figure 2:
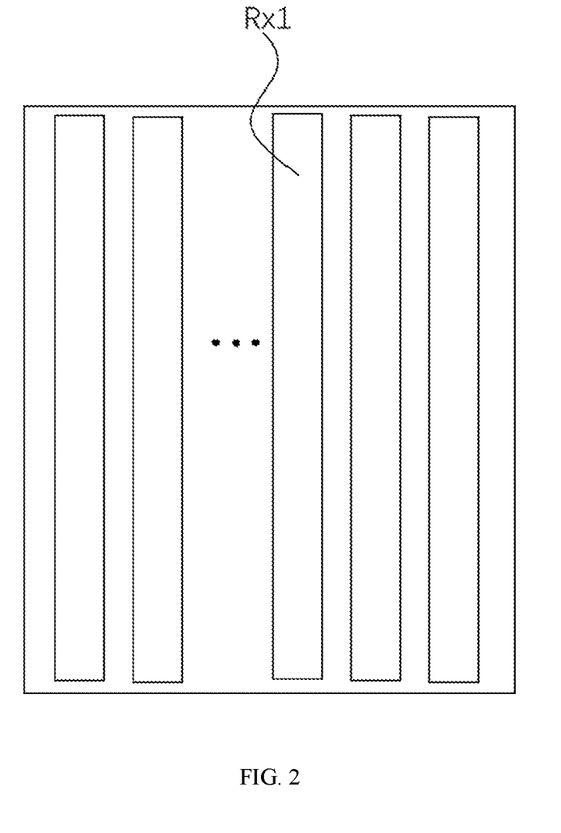
FIG. 2 is a structural diagram of a touch electrode formed by a transparent conductive layer shown in FIG. 1.
Figure 3:
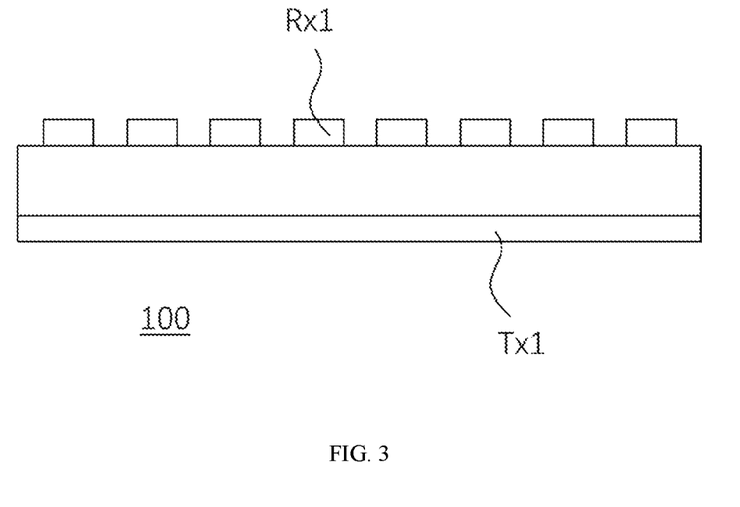
FIG. 3 is a structural diagram of a touch module, shown in FIG. 2, from another angle.

FIGS. 2 and 3 are structural diagrams of the touch module from different angles according to the embodiment of the present disclosure. The touch module 100 includes the substrate 50, the first transparent conductive layer 51, and the second transparent conductive layer 52. The first transparent conductive layer 51 and the second transparent conductive layer 52 respectively form first touch electrodes TX and second touch electrodes RX. In this embodiment, multiple strip-shaped touch electrodes are provided. However, this is only exemplary, and does not limit the scope of protection of the present disclosure. In other embodiments, the touch electrodes may be rhombic or square, etc.

Figure 4:
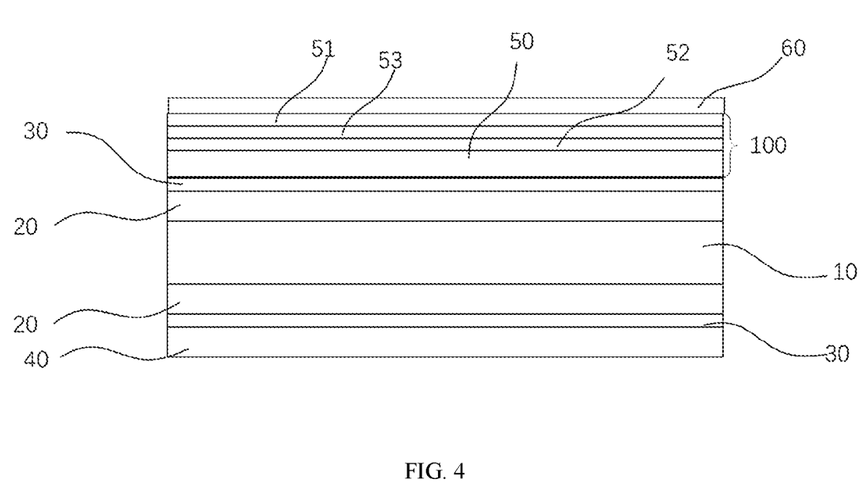
FIG. 4 is a structural diagram of a polarizer according to another embodiment of the present disclosure.

FIG. 4 is a structural diagram of a polarizer according to another embodiment of the present disclosure. In this embodiment, the structure of the polarizer is similar to that of the polarizer in the embodiment of FIG. 1. The difference is that, in this embodiment, the first transparent conductive layer 51 and the second transparent conductive layer 52 of the touch module 100 are provided on the second surface of the substrate 50. Specifically, the second surface of the substrate 50 is sequentially provided with the second transparent conductive layer 52, an insulating layer 53, the first transparent conductive layer 51, and a protective layer 60.

Figure 5:
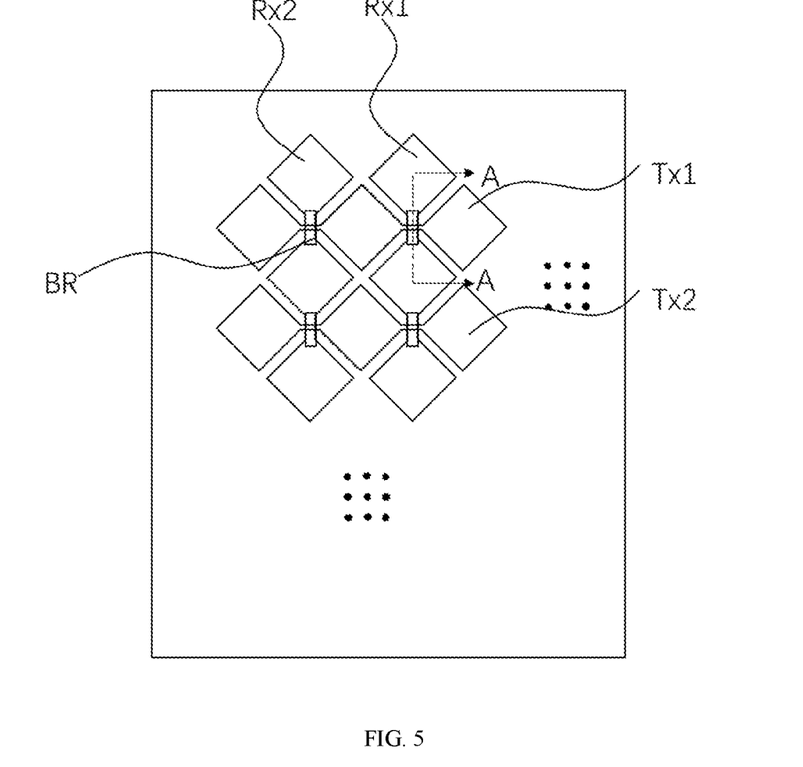
FIG. 5 is a structural diagram of touch electrodes formed by a first transparent conductive layer and a second transparent conductive layer shown in FIG. 4.
Figure 6:
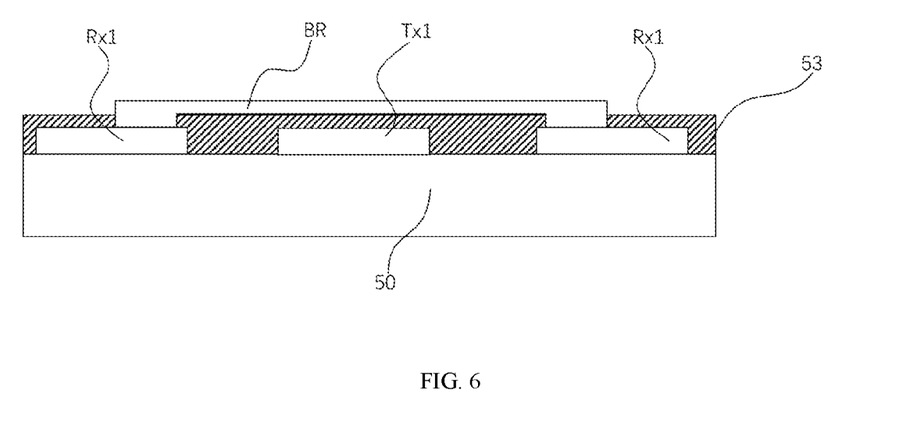
FIG. 6 is a sectional view taken along A-A in FIG. 5.

FIGS. 5 and 6 are structural diagrams of the touch module 100 of the polarizer, shown in FIG. 4, according to the embodiment of the present disclosure. FIG. 6 is a sectional view taken along A-A in FIG. 5. As shown in FIG. 5, in this embodiment, the touch electrodes formed by the transparent conductive layer of the touch module 100 are rhombic electrodes. In this embodiment, the rhombic electrodes are formed by the second transparent conductive layer 52, and the first transparent electrode 51 forms bridges BR. The touch electrodes include multiple rows of electrodes Tx and multiple columns of electrodes Rx. In each row of electrodes, the rhombic electrodes are connected to each other. In each column of electrodes, the rhombic electrodes are connected by the bridges BR. The insulating layer 53 is provided at a connection between the bridges BR and the row electrodes. FIG. 6 shows a bridge connection method. The insulating layer 53 isolates the bridges BR from the row electrodes Tx.

Figure 7:
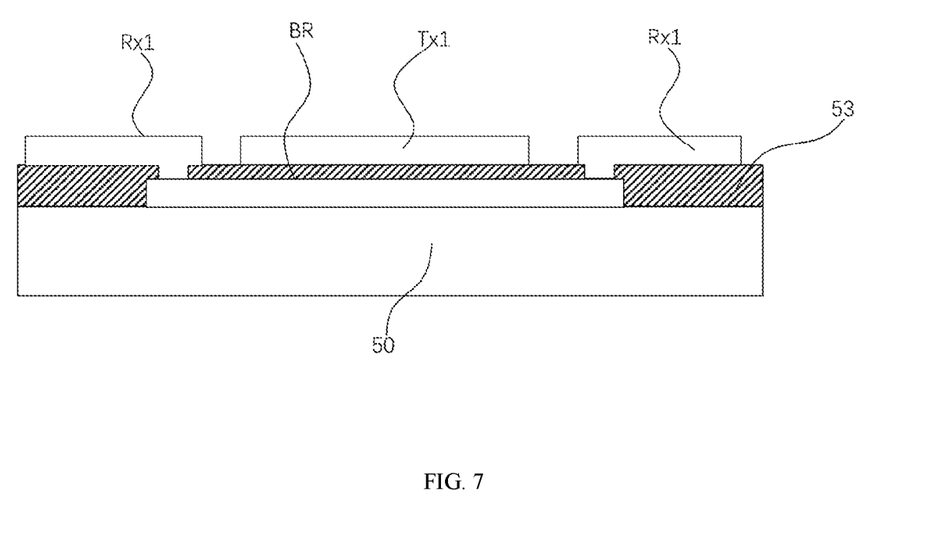
FIG. 7 is a sectional view of a touch electrode according to another embodiment of the present disclosure.

As shown in FIG. 7, in another embodiment of the present disclosure, the rhombic electrodes are formed by the first transparent conductive layer 51, and the second transparent electrode 52 forms the bridges BR. The insulating layer 53 isolates the bridges BR from the row electrodes Tx.

When the polarizer of the present disclosure is used in a touch-sensitive LCD panel and module, the touch sensing function is realized by a polyethlene terephthalate (PET) film on the polarizer, which effectively reduces the thickness of the traditional product with a GFF structure. In addition, the touch sensing function is directly realized in the production process of the polarizer, which effectively reduces the production cost of the touch-sensitive LCD panel and module and improves the production efficiency thereof.

The above are only the preferred embodiments of the present disclosure, and thus the scope of the present disclosure is not limited thereto. Equivalent changes and modifications made in accordance with the claims and specifications of the present disclosure should fall within the patent scope of the present disclosure. In addition, it is not necessary for any embodiment or claim of the present disclosure to achieve all of the objectives or advantages or features of the present disclosure. The abstract and title are only used to aid in the retrieval of the patent document and are not intended to limit the scope of the claims of the present disclosure. In addition, terms such as "first" and "second" mentioned in this specification or the claims are only used to name the elements or to distinguish different embodiments or ranges, rather than to limit the upper or lower limit of the number of elements.

What is claimed is:

1. A polarizer, comprising:
   a substrate comprising a first surface and a second surface that are opposite to each other; and
   a first triacetyl cellulose (TAC) film;
   a polyvinyl acetate (PVA) film; and
   a second TAC film that are provided on the first surface of the substrate;
   wherein the polarizer further comprises a first transparent conductive layer, an insulating layer coupled to the first transparent conductive layer, and a second transparent conductive layer coupled to the insulating layer;
   wherein the second transparent conductive layer is coupled to the second surface of the substrate form a touch electrode; and
   wherein the substrate is coupled between the second conductive layer and the first TAC film.

2. The polarizer according to claim 1, wherein the first surface and the second surface of the substrate are respectively provided with transparent conductive layers to form a first touch electrode and a second touch electrode, respectively.

3. The polarizer according to claim 1, wherein one of the first transparent conductive layer and the second transparent conductive layer forms a first touch electrode and a second touch electrode, and the other of the first transparent conductive layer and the second transparent conductive layer forms a bridge.

4. The polarizer according to claim 3, wherein one of the first touch electrode and the second touch electrode is connected by the bridge.

5. The polarizer according to claim 1, wherein the polarizer further comprises a protective layer, and the protective layer is provided on a side of the substrate away from the PVA film and on an outermost surface of the polarizer.

6. The polarizer according to any one of claim 1, wherein the transparent conductive layer is an indium tin oxide (ITO) conductive layer, an indium zinc oxide (IZO) conductive layer, a nano-silver wire conductive layer, or a metal mesh conductive layer.

7. A touch-sensitive liquid crystal display (LCD) panel, sequentially comprising an array substrate, a liquid crystal layer, an electrode layer, a filter, and a polarizer;
   wherein the polarizer comprises:
   a substrate comprising a first surface and a second surface that are opposite to each other; and
   a first triacetyl cellulose (TAC) film;
   a polyvinyl acetate (PVA) film; and
   a second TAC film that are provided on the first surface of the substrate;
   wherein the polarizer further comprises a first transparent conductive layer, an insulating layer coupled to the first transparent conductive layer, and a second transparent conductive layer coupled to the insulating layer;

wherein the second transparent conductive layer is coupled to the second surface of the substrate; and wherein the substrate is coupled between the second conductive layer and the first TAC film.

8. The touch-sensitive LCD panel according to claim 7, wherein the transparent conductive layer is an ITO conductive layer, an IZO conductive layer, a nano-silver wire conductive layer, or a metal mesh conductive layer.

9. A touch-sensitive LCD module, comprising:

a backlight module; and a touch-sensitive LCD panel, comprising an array substrate, a liquid crystal layer, an electrode layer, a filter and a polarizer;

wherein the polarizer comprises:

a substrate comprising a first surface and a second surface that are opposite to each other; and a first triacetyl cellulose (TAC) film;

a polyvinyl acetate (PVA) film; and a second TAC film that are provided on the first surface of the substrate;

wherein the polarizer further comprises a first transparent conductive layer, an insulating layer coupled to the first transparent conductive layer, and a second transparent conductive layer coupled to the insulating layer;

wherein the second transparent conductive layer is coupled to the second surface of the substrate; and wherein the substrate is coupled between the second conductive layer and the first TAC film.

\* \* \* \* \*